(12) United States Patent
Clements et al.

(10) Patent No.: US 6,659,475 B2
(45) Date of Patent: Dec. 9, 2003

(54) DECOUPLABLE LINK FOR A STABILIZER BAR

(75) Inventors: Mark Clements, Columbiaville, MI (US); Joe Fader, Brighton, MI (US); Chris Keeney, Troy, MI (US); Steve Yollick, Troy, MI (US); Jim Hawkins, Madison, AL (US)

(73) Assignee: Meritor Light Vehicle, LLC, Troy, MI (US)

(*) Notice: Subject to any disclaimer, the term of this patent is extended or adjusted under 35 U.S.C. 154(b) by 100 days.

(21) Appl. No.: 09/800,072

(22) Filed: Mar. 6, 2001

(65) Prior Publication Data

US 2002/0125675 A1 Sep. 12, 2002

(51) Int. Cl.⁷ .............................................. B60G 21/10
(52) U.S. Cl. ............................ 280/5.508; 280/124.107; 267/188
(58) Field of Search .................. 280/124.107, 124.106, 280/5.508, 5.511; 267/188, 277

(56) References Cited

U.S. PATENT DOCUMENTS

| | | | |
|---|---|---|---|
| 4,621,831 A | | 11/1986 | Takadera et al. |
| 4,648,620 A | * | 3/1987 | Nuss ................... 280/124.106 |
| 4,664,408 A | * | 5/1987 | Saotome et al. ...... 280/124.106 |
| 4,828,283 A | | 5/1989 | Ishii et al. |
| 5,186,486 A | | 2/1993 | Hynds et al. |
| 5,217,245 A | * | 6/1993 | Guy .......................... 280/5.511 |
| 5,505,480 A | | 4/1996 | Pascarella |

FOREIGN PATENT DOCUMENTS

| | | |
|---|---|---|
| GB | 2 006 131 A | 5/1979 |
| JP | 05032115 A * | 2/1993 |
| WO | WO 92/12869 | 8/1992 |

OTHER PUBLICATIONS

European Search Report for EP 02 25 1381 dated Jun. 11, 2002.
Patent Abstracts of Japan, No. 07257143, Oct. 9, 1995.
Patent Abstracts of Japan, No. 05032115, Feb. 9, 1993.
Patent Abstracts of Japan No. 07089324 Apr. 4, 1995.
Patent Abstracts of Japan No. 57066009, Apr. 22, 1982.

* cited by examiner

*Primary Examiner*—Peter C. English
(74) *Attorney, Agent, or Firm*—Carlson, Gaskey & Olds

(57) ABSTRACT

A suspension system includes a stabilizer bar having decouplable end links. A first segment of each end link is attached to the suspension member while a second segment is attached to the stabilizer bar. The second segment preferably selectively telescopes within the first segment. When the end links are engaged, the stabilizer bar is rigidly linked to the suspension members to provide roll resistance in a known manner. When the end links are disengaged, the second segment telescopes relative to the first segment to decouple motion of the suspension member from the stabilizer bar. The affect of the stabilizer bar is removed and the articulation range of suspension system is increased as it is unhindered by the torsional resistance produced by the stabilizer bar. Activation can be provided automatically through the controller or manually through a switch operated by the driver.

13 Claims, 3 Drawing Sheets

DECOUPLABLE LINK FOR A STABILIZER BAR

BACKGROUND OF THE INVENTION

The present invention relates to a suspension system for a vehicle, and more specifically to a decouplable stabilizer bar link arrangement which provides selectively increased suspension articulation.

Vehicles are commonly equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle.

Typically, the stabilizer bar is an elongated member oriented to extend laterally across the vehicle with a first and second segment extending longitudinally at each end of the central segment. The central segment of the stabilizer bar is supported for rotation about its own longitudinal axis by one or more mounting brackets which are fixed to the vehicle body or frame. Each longitudinal segment is attached to a suspension member such as a control arm of the suspension system by an end link.

When the vehicle is subjected to a lateral rolling force such as, for example, while the vehicle negotiates a turn, the longitudinal segments pivot in opposite directions with respect to the longitudinal axis of the central segment. As a result, torsional reaction forces are generated which act through the segments to urge the suspension members to move toward their normal position. Thus, the vehicle body will be prevented from excessive rolling or leaning to either side by the torsional resistance produced by the stabilizer bar.

Increasingly desirable are vehicles such as Sport Utility Vehicles (SUVs) that combine the driveability characteristics of a passenger car with the ability to deliver off-road performance. One desired off-road performance characteristic of such a vehicle is the ability of the suspension to articulate through a larger range of motion. Increased suspension articulation improves control and traction when driving at slow speeds over large obstacles, such as rocks, ditches, logs, etc.

One of the drawbacks inherent in the use of stabilizer bars is that they trade suspension articulation for increased roll stiffness. As the vehicle suspension is forced through large displacements, the torsional resistance of the stabilizer bar prevents the suspension from attaining its maximum range of articulation.

In one known system an active link connects the stabilizer bar to the control arm. The active link assembly provides a controllable link which is actively adjusted to road conditions. However this known system requires a relatively complex rack and pinion gear arrangement. Further, movement of the link requires a large actuator assembly at each wheel which increases suspension system weight.

It is desirable to provide a stabilizer bar attachment arrangement that selectively permits the suspension to articulate free of stabilizer bar resistance during large suspension articulation. It would be particularly desirable to provide a lightweight selectively decouplable stabilizer bar link which does not require a complex actuator.

SUMMARY OF THE INVENTION

The suspension system according to the present invention provides a stabilizer bar which is attached to respective vehicle suspension members by decouplable end links. A first segment of each end link is attached to the suspension member while a second segment is attached to the stabilizer bar. The second segment preferably telescopes within the first segment to selectively decouple motion of the suspension members from the stabilizer bar.

The links are preferably in communication with a controller and sensors which sense motion of the suspension members. The controller interprets signals from the sensors and determines whether the links should be coupled or decoupled. Activation can be provided automatically through the controller or manually through a switch operated by the driver. The switch preferably includes an "on-road" and an "off-road" setting.

In one embodiment a locking assembly includes an engagement member in the first segment which interacts with a groove in the second segment. When the engagement member is located in the groove, the end link is rigid and the stabilizer bar is linked to the suspension members to provide roll resistance in a known manner.

When the engagement member is released from the groove, the second segment is slidable relative to the first segment. Relative movement between the first segment and the second segment effectively decouples motion of the suspension member from the stabilizer bar. The affect of the stabilizer bar is thus removed and the articulation range of suspension system is increased as it is unhindered by the torsional resistance produced by the stabilizer bar.

The various features and advantages of this invention will become apparent to those skilled in the art from the following detailed description of the currently preferred embodiment. The drawings that accompany the detailed description can be briefly described as follows:

DETAILED DESCRIPTION OF THE PREFERRED EMBODIMENT

Figure 1:
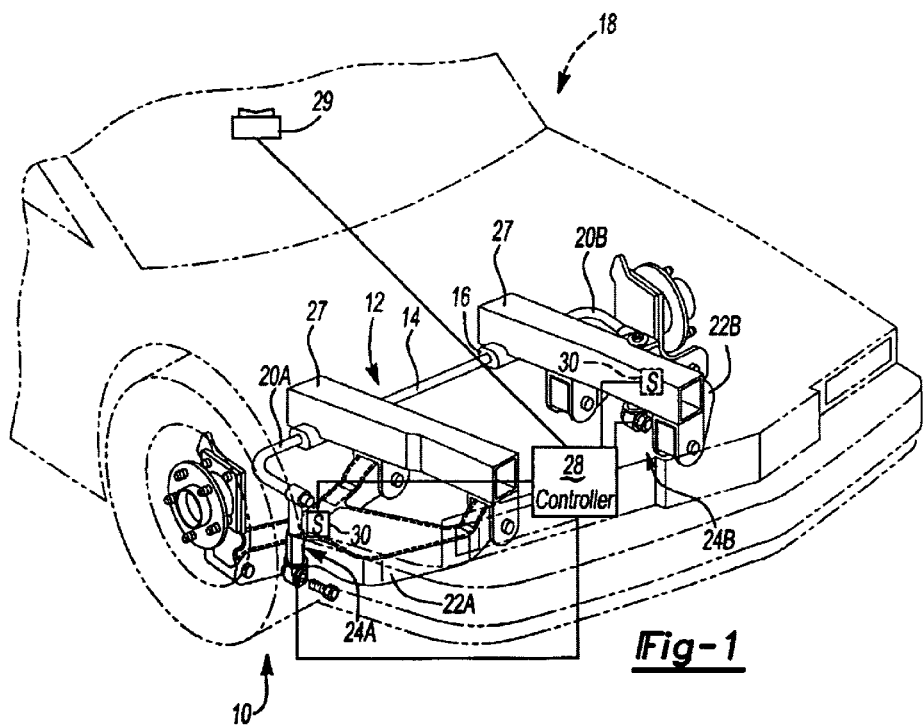
FIG. 1 is a general phantom view of a vehicle illustrating a suspension system having a stabilizer bar decoupler assembly.

FIG. 1 illustrates a schematic perspective view of a vehicle suspension system 10. In the disclosed embodiment, a stabilizer bar 12 includes a central portion 14 transversely mounted by brackets 16 to a frame member 27 of a vehicle 18. First and second lateral segments 20A,20B of the stabilizer bar 12 are attached to the suspension members 22A, 22B, by end links 24A, 24B.

Preferably, the end links 24A, 24B selectively disengage motion of the suspension members 22A, 22B from the stabilizer bar 12. For example only, when the vehicle 18 is to be driven in an off-road environment, the end links 24A, 24B are decoupled. The suspension members 22A, 22B can then be articulated through a larger range of motion without resistance from the stabilizer bar 12.

The links 24A, 24B are preferably in communication with a controller 28 and sensors 30, shown schematically. The sensors 30 are preferably located adjacent the suspension members 22A, 22B, to sense motion of the suspension members 22A, 22B. It should be understood that the motion of the suspension members can be interpreted from speed, distance moved, acceleration, or other data. It should be further understood that other sensors and other mounting locations will benefit from the present invention. The controller 28 interprets the signals from the sensors 30 and determines whether the links 24A, 24B should be decoupled. Activation can be provided automatically through the controller 28 or manually through a switch (shown schematically at 29) operated by the driver. The switch 29 preferably includes an "on-road" and an "off-road" setting.

Figure 2:
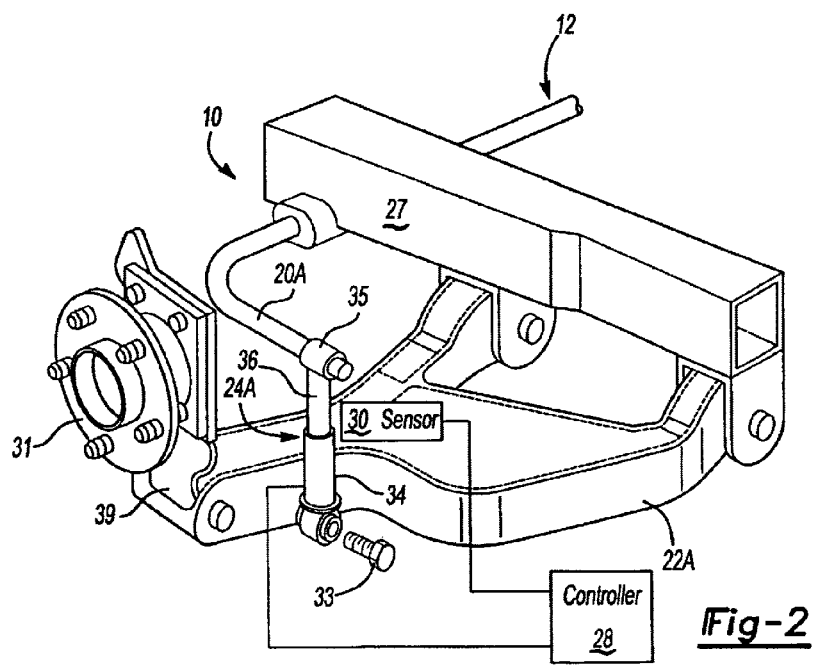
FIG. 2 is an expanded view of the vehicle suspension system of FIG. 1.

An expanded view of the suspension member 22A is illustrated in FIG. 2. The suspension system 10 is attached to the frame member 27 along the longitudinal axis of the vehicle 18. The suspension member 22A is pivotally connected to a knuckle 39 which supports a wheel mounting assembly 31. When the wheel (not illustrated) mounted on the wheel mounting assembly 31 travels in jounce and rebound, the suspension member 22A pivots with respect to the frame member 27 in a known manner.

The end link 24A connects the suspension member 22A with the stabilizer bar 12. A first segment 34 of the end link 24A is attached to the suspension member 22A by a fastener 33 or the like. A second segment 36 of the end link 24A includes a barrel portion 35 that receives the lateral segment 20A of the stabilizer bar 12. It should be understood that other types of attachment elements for the end link 24A can also be substituted.

Figure 3A:
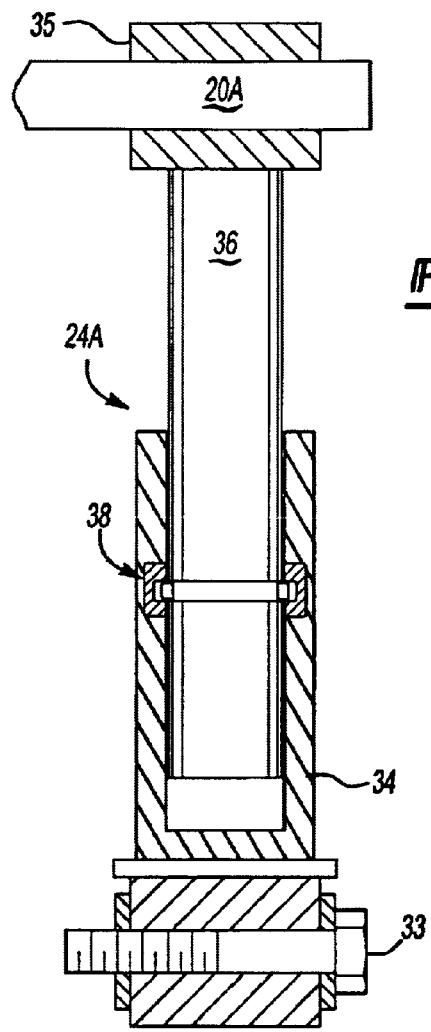
FIG. 3A is an expanded view of one stabilizer bar end link assembly according to the present invention in a first position.
Figure 3B:
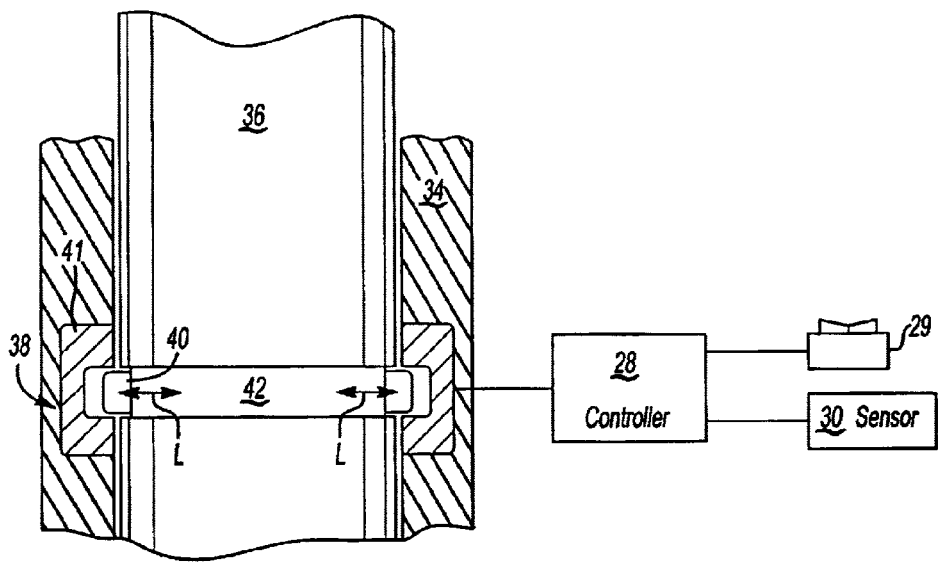
FIG. 3B is an expanded view of the end link assembly of FIG. 3A illustrating a locking assembly in a first position.

Referring to FIG. 3A an expanded view of the end link 24A is illustrated. Although only a single link 24A is illustrated, ft will be realized that the other end link 24B (FIG. 1) may be effectively identical. The first segment 34 of the end link 24A is attached to the suspension member 22A and is preferably a cylindrical member that slidably receives the second segment 36 of the end link 24A. The second segment 36 is coupled and decoupled from the first segment 34 by a locking assembly 38. The second segment 36 is attached to the stabilizer bar 12 and preferably telescopes within the first segment 34. In addition, grommets may be located between the end link 24A, suspension member 22A, and stabilizer bar 12 to reduce undesirable noise and vibration. Referring to FIG. 3B, the locking assembly 38 preferably includes an engagement member 40 located within the first segment 34 and a groove 42 within the second segment 36. However, the engagement member 40 can alternately be located in the second segment 36 to engage the first segment 34. Interaction between the engagement member 40 and the groove 42 couples and decouples the first segment 34 and the second segment 36.

When the locking assembly 38 is activated, the engagement member 40 is located within the groove 42. The first segment 34 is locked to the second segment 36 to couple motion of the stabilizer bar 12 with the suspension members 22A, 22B. The stabilizer bar 12 is thereby linked to die suspension system 10 (FIG. 1) to provide roll resistance in a known manner.

One disclosed embodiment provides for the locking member 38 to be electro-mechanicaly operated such as by a solenoid or the like. Solenoids are known and typically include a movable plunger within an electromagnetic actuator. In this disclosed embodiment, the movable plunger is the engagement member 40 which is driven by the actuator 41 into and out of the groove 42. Movement of the engagement member 40 is represented by the double headed arrows "L". Preferably, the controller 28 interprets the signals from the sensor 30 to control operation of the actuator 41 and engagement member 40. In another embodiment the locking assembly 38 is manually actuated by the driver operated switch 29.

The groove 42 is preferably located in the second segment 36 to be aligned with the engagement member 40 when the suspension system 10 (FIG. 1) is in its normal unarticulated state. In other words, irrespective of the activation state of the engagement member 40, when the vehicle 18 is stationary the engagement member 40 is in alignment with the groove 42.

Figure 4A:
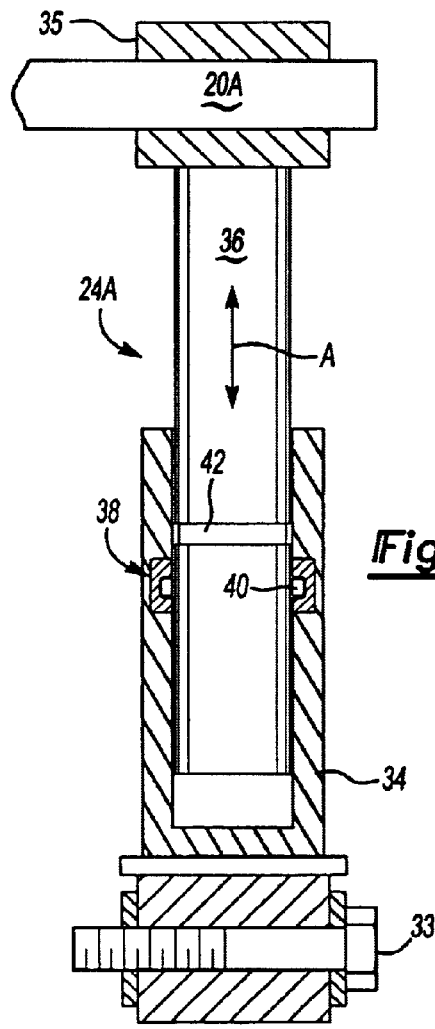
FIG. 4A is an expanded view of one stabilizer bar end link assembly according to the present invention in a second position.

Referring to FIG. 4A, when the locking assembly 38 is disengaged, the second segment 36 is movable in the direction of double headed arrow "A" relative to the first segment 34. The second segment 36 is free to independently move with the stabilizer bar 12 and the first segment 34 is free to independently move with the suspension member 22A. Relative movement between the first segment 34 and the second segment 36 decouples motion of the suspension member 22 22A from the stabilizer bar 12.

Figure 4B:
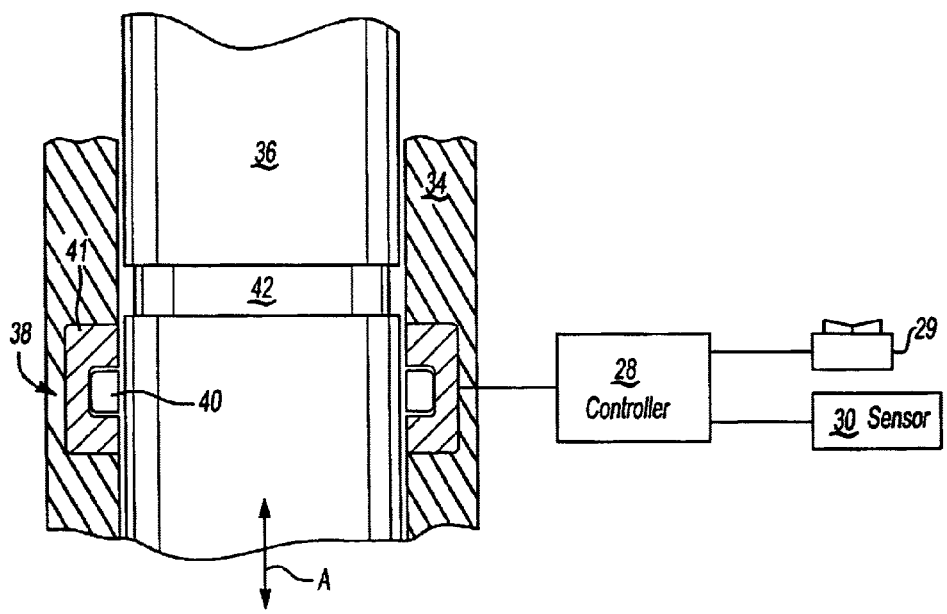
FIG. 4B is an expanded view of the end link assembly of FIG. 4A illustrating the locking assembly in a second position.

Referring to FIG. 4B, the engagement member 40 is moved out of the groove 42 by the actuator 41. The affect of the stabilizer bar 12 is thus removed and the articulation range of suspension system 10 (FIG. 1) is increased as it is unhindered by the torsional resistance produced by the stabilizer bar 12.

In operation, the engagement member 40 is engaged with the groove 42. The second segment 36 is rigidly linked to the first segment 34 (FIGS. 3A–B) and the end links 24A,B operate to couple the suspension members 22A,22B with the stabilizer bar 12 in a known manner. This is the preferred condition for an on-road driving environment as excessive roll is reduced by the torsional resistance produced by the stabilizer bar 12.

When greater suspension system 10 articulation is required, such as during off-road conditions, the engagement member 40 is disengaged from the groove 42 (FIGS. 4A–B). As the suspension member 22A is decoupled from the stabilizer bar 12, articulation of the suspension system 10 is increased as it is unhindered by the torsional resistance normally provided by the stabilizer bar 12.

The sensors 30 identify that the suspension members 22A, 22B (FIG. 1) are in an unarticulated condition and that the engagement member 40 should now be in alignment with the groove 42. In response, the controller 28 activates the engagement member 40 to engage the groove 42. The stabilizer bar 12 is then again coupled to the suspension members 22A, 22B.

The locking assembly 38 can also be placed in a "ready to couple" condition. In the "ready to couple" condition a driver desires the stabilizer bar 12 to be engaged with the suspension member 22A but the engagement member 40 is not located adjacent the groove 42 (FIGS. 4A–B). During this condition, the engagement member 40 will fire as soon as it passes by the groove 42. Typically, the "ready to couple" condition is in effect when the manual switch 29 is switched to the "on-road" setting during operation of the vehicle 18 in an off-road environment. However, automatic activation by the controller 28 can also benefit from the "ready to couple" condition.

Accordingly, the present invention provides a suspension system that provides increased articulation during off-road conditions while providing improved anti-roll when operating in an on-road environment, without sacrificing either.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system for a vehicle comprising:

a suspension member;

a stabilizer bar; and an end link having a first segment selectively engageable with a second segment through am electro-magnetic locking assembly located within a cylindrical wall of said first segment to selectively couple and decouple said stabilizer bar from said suspension member, said first segment attached to said suspension member and said second segment attached to said stabilizer bar, said end link substantially coupling motion of said suspension member and said stabilizer bar when said first segment is engaged with said second segment and said end link substantially decoupling motion of said suspension member and said stabilizer bar when said first Segment is disengaged from said second segment.

2. The suspension system as recited in claim 1, wherein said second segment is slidable relative to said first segment.

3. The suspension system as recited in claim 1, wherein said second segment telescopes within said first segment.

4. The suspension system as recited in claim 1, further comprising a sensor in communication with said suspension member, said sensor operable to sense a quantity indicative of a force encountered by said suspension member.

5. The suspension system as recited in claim 4, further comprising a controller in communication with said sensor and said locking assembly, said locking assembly actuatable by said controller in response to a manually activated switch.

6. The suspension system as recited in claim 1, wherein said first segment slides freely relative said second segment when said first segment is disengaged from said second segment.

7. The suspension system as recited in claim 1, wherein said second segment is attached to a lateral segment of said stabilizer bar.

8. A suspension system for a vehicle comprising:

a suspension member;

a stabilizer bar;

an end link first segment attached to said suspension member;

an end link second segment attached to said stabilizer bar, said second segment slidable relative to said end link first segment;

an electro-magnetic locking assembly ocated within a cylindrical wall of said first segment to selectively decouple said stabilizer bar from said suspension member;

a sensor in communication with said suspension member, said sensor operable to sense a quantity indicative of a force encountered by said suspension member; and a controller in communication with said sensor and said locking assembly, said controller operable to activate said locking assembly in response to a signal from said sensor to achieve or prevent relative motion between said stabilizer bar and said suspension member.

9. The suspension system as recited in claim 8, wherein said locking assembly includes an engagement member in said end link first segment and a groove in said end link second segment, said engagement member movable into and out of said groove.

10. The suspension system as recited in claim 9, wherein said locking assembly is engaged in response to said groove passing by said engagement member.

11. The suspension system as recited in claim 10, wherein said locking assembly is engaged by said controller.

12. The suspension system as recited in claim 10, wherein said locking assembly is engaged in response to a manually activated switch.

13. The suspension system as recited in claim 9, wherein said locking assembly comprises a selectable condition selectable only when said groove is not aligned with said engagement member, said selectable condition operates to selectively engage said engagement member with said groove once said groove moves into alignment with said engagement member.

* * * * *

UNITED STATES PATENT AND TRADEMARK OFFICE
CERTIFICATE OF CORRECTION

PATENT NO. : 6,659,475 B2
DATED : December 9, 2003
INVENTOR(S) : Clements et al.

It is certified that error appears in the above-identified patent and that said Letters Patent is hereby corrected as shown below:

<u>Column 5,</u>
Line 22, "am" should be -- an --
Line 33, "Segment" should be -- segment --

<u>Column 6,</u>
Line 12, "ocated" should be -- located --

Signed and Sealed this

Twenty-third Day of March, 2004

JON W. DUDAS
*Acting Director of the United States Patent and Trademark Office*